(12) United States Patent
Kawai (10) Patent No.: US 8,289,555 B2
(45) Date of Patent: Oct. 16, 2012

(54) PRINT SYSTEM, RECORDING MEDIUM THAT STORES PRINTING PROGRAM CODES AND METHOD OF PRINTING

(75) Inventor: Takanao Kawai, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 264 days.

(21) Appl. No.: 12/615,448

(22) Filed: Nov. 10, 2009

(65) Prior Publication Data

US 2010/0195144 A1  Aug. 5, 2010

(30) Foreign Application Priority Data

Jan. 30, 2009 (JP) ................................. 2009-020995

(51) Int. Cl.
*G06F 3/12* (2006.01)
(52) U.S. Cl. ...................................... 358/1.15; 358/437
(58) Field of Classification Search ........... 358/1.1–3.23
See application file for complete search history.

(56) References Cited

U.S. PATENT DOCUMENTS

| | | | |
|---|---|---|---|
| 2003/0225821 A1* | 12/2003 | Wanda | 709/201 |
| 2004/0126166 A1* | 7/2004 | Miyake | 400/74 |
| 2007/0146778 A1* | 6/2007 | Kitagata et al. | 358/1.15 |
| 2007/0268512 A1 | 11/2007 | Sakakibara | |
| 2008/0144100 A1 | 6/2008 | Tomii et al. | |
| 2008/0259399 A1 | 10/2008 | Wada | |

FOREIGN PATENT DOCUMENTS

| | | |
|---|---|---|
| CN | 101290560 | 4/2008 |
| JP | 10-177464 | 6/1998 |
| JP | 2007-226291 | 9/2007 |

* cited by examiner

*Primary Examiner* — Benny Q Tieu
*Assistant Examiner* — Marcellus Augustin
(74) *Attorney, Agent, or Firm* — K&L Gates LLP (57) ABSTRACT

A print system includes a print server and a first printer. The first printer receives print job data and executes printing. The first printer includes a job-data communication unit that receives the print job data from the print server; a job-processing-result notification unit that provides the print server with page-by-page print completion information; and a transfer request unit that transmits a request to transfer print job data corresponding to interrupted print job to the print server. The print server receives the print job data from a terminal device and includes a job-related-notification communication unit that receives the page-by-page print completion information; a job-data accumulation unit that accumulates the print job data from the terminal device and the page-by-page print completion information along with the print job data; and a job-data transfer unit that transfers the accumulated print job data to the first printer in response to the transfer request.

12 Claims, 9 Drawing Sheets

FIG. 9

PRINT SYSTEM, RECORDING MEDIUM THAT STORES PRINTING PROGRAM CODES AND METHOD OF PRINTING

INCORPORATION BY REFERENCE

This application is based upon and claims the benefit of priority from the corresponding Japanese Patent application No. 2009-020995, filed Jan. 30, 2009, the entire contents of which are incorporated herein by reference.

BACKGROUND

1. Field of the Invention

The present invention relates to achieving secure printing in a print system, a recording medium that stores printing program codes and a method of printing.

2. Description of the Related Art

Recently, it has been known to connect a plurality of printers over a network where they can be shared. Some of printed matter printed in such an environment is of a highly confidential nature. Thus, in recent years, the need for preventing a disclosure of such information, for example, due to leaving the printed matter, or allowing the information to be read or taken by a third person, is increasing.

To meet these needs, a system in which print job data is given an identification code so that it cannot be printed unless the identification code is inputted from the operation panel of a printer is used.

Even in such a system, when a print job is interrupted, due to a printer failure (such as paper jam, paper empty, or a memory error), and then executed again, the print process needs to be started from the beginning. This increases the risk of an unintentional disclosure of information, depending on how the material that printed before the failure is disposed of. It is also possible to temporarily cancel the print job and to give an instruction to print only the remaining pages from a terminal device; however, this creates increased work for the user. In either situation, it increases the time to output the information, and thus it is not a preferable solution to the security issues.

SUMMARY

A print system according to an embodiment of the present invention includes a print server and a first printer. The first printer is configured to receive print job data and to execute printing. The first printer includes a job-data communication unit, a job-processing-result notification unit, and a transfer request unit. The job-data communication unit is configured to receive the print job data from the print server. The job-processing-result notification unit is configured to provide the print server with a page-by-page of print completion information. The transfer request unit is configured to transmit a request to transfer print job data corresponding to an interrupted print job to the print server. The print server is configured to receive the print job data from a terminal device. The print server includes a job-related-notification communication unit, a job-data accumulation unit, and a job-data transfer unit. The job-related-notification communication unit is configured to receive the page-by-page print completion information from the job-processing-result notification unit. The job-data accumulation unit is configured to accumulate the print job data received from the terminal device and to accumulate, in association with the print job data, the page-by-page print completion information. The job-data transfer unit is configured to transfer, in response to the transfer request from the transfer request unit, the print job data accumulated in the job-data accumulation unit to the first printer that generated the transfer request.

According to an embodiment of the present invention, a computer-readable recording medium stores printing program codes that are executed by a first printer computer and a print server computer. The printing program codes include first to seventh program codes. The first program code causes the print server computer to receive print job data from a terminal device and to accumulate the print job data. The second program code causes the first printer computer to receive the print job data from the print server. The third program code causes the first printer computer to print the print job data. The fourth program code causes the first printer computer to provide the print server with a page-by-page of print completion information. The fifth program code causes the print server computer to receive the page-by-page print completion information from the first printer. The fifth program code causes the print server computer to accumulate, in association with the print job data, the page-by-page print completion information. The sixth program code causes the first printer computer to transmit a request to transfer print job data corresponding to an interrupted print job to the print server. The seventh program code causes the print server computer to transfer, in response to the transfer request from the first printer, the accumulated print job data to the first printer that generated the transfer request.

A method of printing according to an embodiment of the present invention includes the steps of: (1) causing a first printer computer to receive a print job data from the print server; (2) causing the first printer computer to print the print job data; (3) causing the first printer computer to provide the print server with page-by-page print completion information; (4) causing the print server computer to receive the page-by-page print completion information from the first printer; (5) causing the print server computer to accumulate the page-by-page print completion information in association with the print job data; (6) causing the first printer computer to transmit a request to transfer print job data corresponding to an interrupted print job to the print server; and (7) causing the print server computer to transfer, in response to the transfer request from the first printer, the accumulated print job data to the first printer that generated the transfer request.

Additional features and advantages are described herein, and will be apparent from the following Detailed Description and the figures.

DETAILED DESCRIPTION

A print system and printing program codes stored in a computer-readable recording medium according to an embodiment of the present invention will be described hereinbelow.

Figure 1:
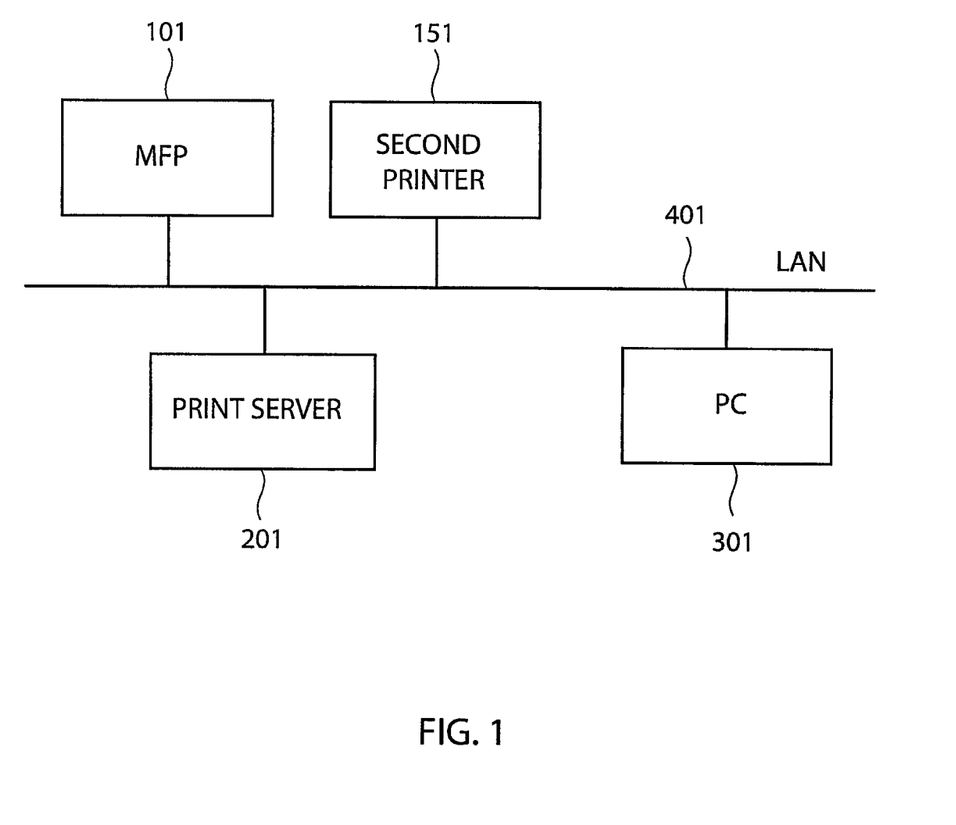
FIG. 1 illustrates a network configuration including a print system according to an embodiment of the present invention.

FIG. 1 illustrates a network configuration including a print system according to an embodiment of the present invention.

The print system includes an MFP (multi functional peripheral) 101 serving as a first printer, a second printer 151, and a print server 201 that accumulates print job data. Furthermore, a PC (personal computer) 301 serving as a terminal device that provides print instructions is present on the network. These devices are connected to one another via a LAN (local area network) 401.

Figure 2:
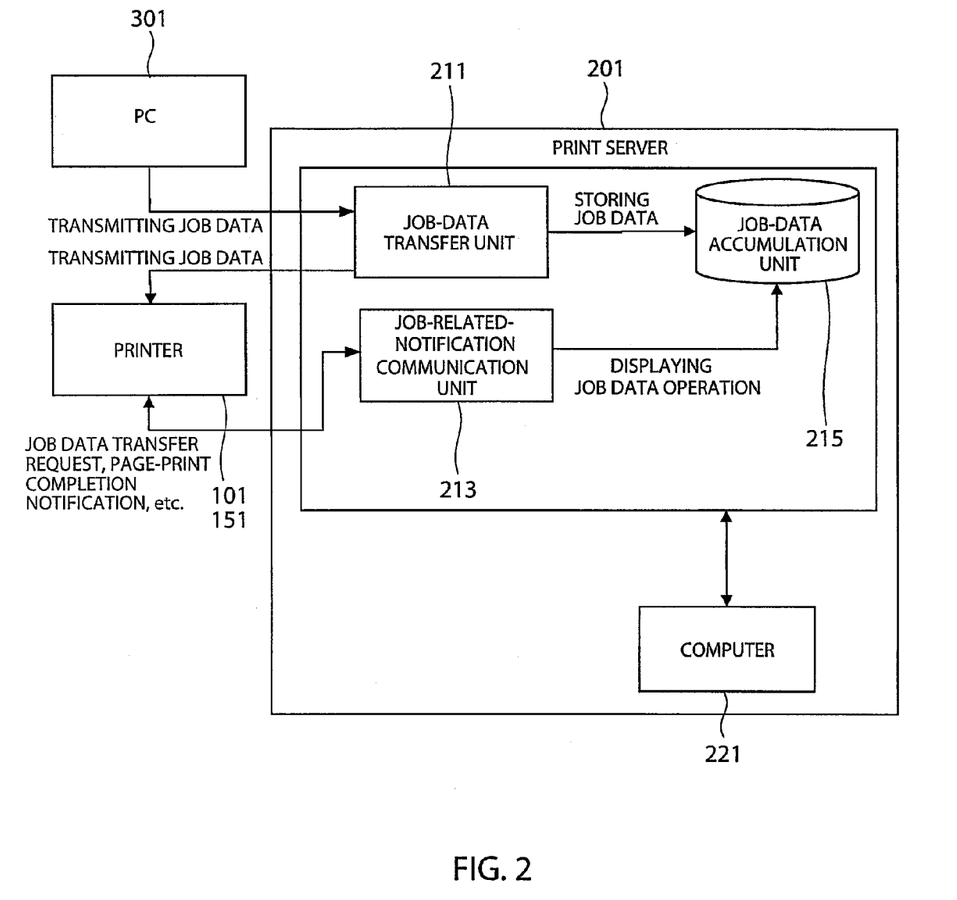
FIG. 2 illustrates a functional block diagram of a print server according to an embodiment of the present invention.
Figure 3:
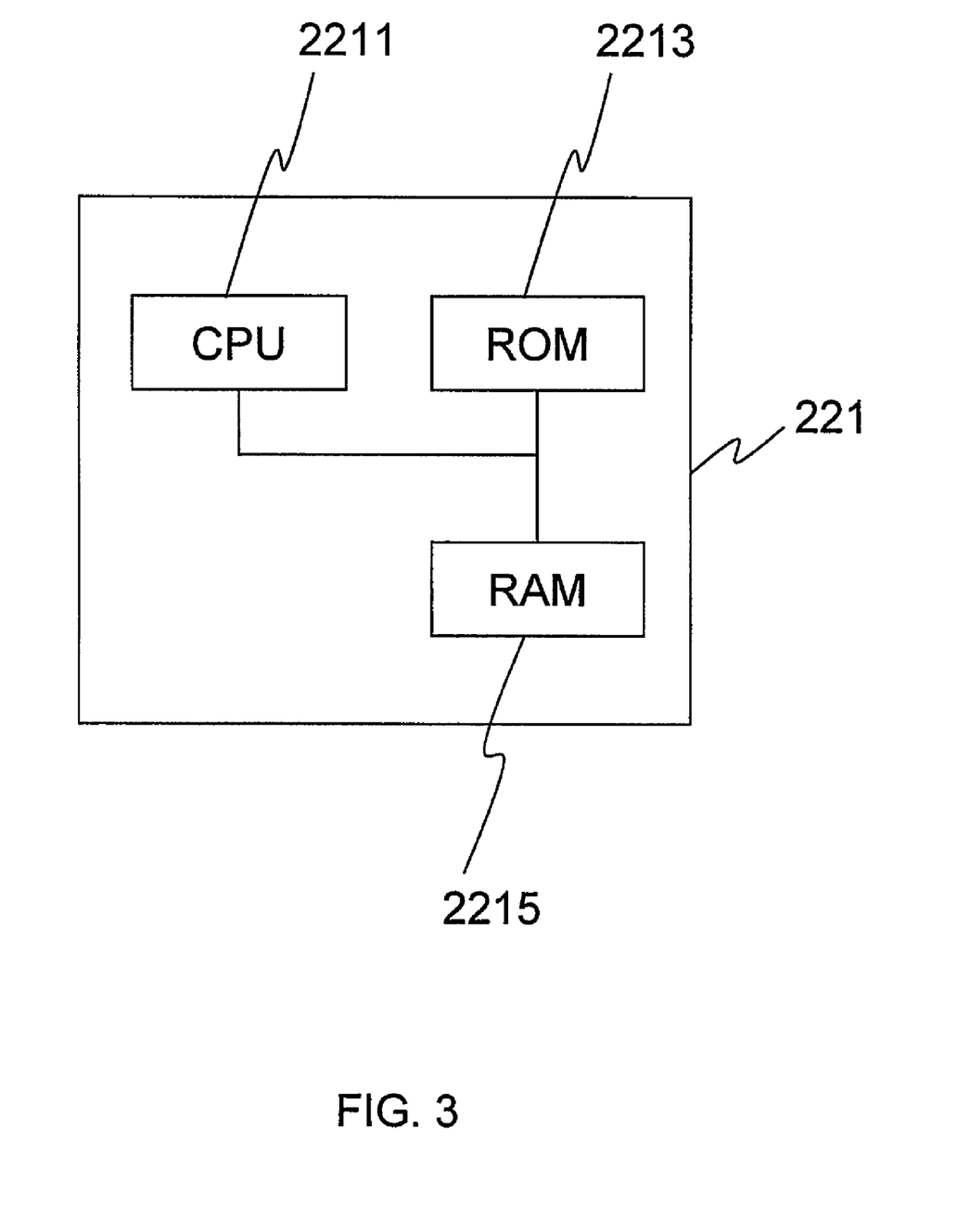
FIG. 3 illustrates the hardware architecture of a computer shown in FIG. 2.

Next, the function of the print server 201 will be described with reference to FIGS. 2 and 3. FIG. 2 illustrates a functional block diagram of the print server 201 according to an embodiment of the present invention. FIG. 3 illustrates the hardware architecture of a computer 221 illustrated in FIG. 2.

As illustrated in FIG. 2, the print server 201 includes the computer 221. As shown in FIG. 3, the computer 221 includes a CPU (central processing unit) 2211, a ROM (read only memory) 2213, and a RAM (random access memory) 2215.

The CPU 2211 is a processing unit that executes processes described in printing program codes on the print server 201. The ROM 2213 is a nonvolatile memory that stores, in advance, the printing program codes and data. The RAM 2215 is a memory that temporarily stores the printing program codes, during the execution thereof, and is used as a work area.

The computer 221 controls components in the print server 201 by executing the printing program codes thereby operating the components as a job-data transfer unit 211, a job-related-notification communication unit 213, and a job-data accumulation unit 215.

The job-data transfer unit 211 is a communication device, such as a NIC (network interface card), and receives print job data transmitted from the PC 301.

The job-data transfer unit 211 receives an identification code from the MFP 101. The job-data transfer unit 211 verifies the received identification code by comparing it against identification codes in the print job data accumulated in the job-data accumulation unit 215. When the two identification codes match, the job-data transfer unit 211 transfers the print job data to the MFP 101 or the second printer 151 designated by the PC 301.

Examples of the identification code are a password, a personal identification number, and a card security code.

The job-data accumulation unit 215 is a nonvolatile readable/writable storage device, such as a hard disk drive or a Flash Memory®. The job-data accumulation unit 215 accumulates print job data that the job-data transfer unit 211 received. The job-data accumulation unit 215 accumulates page-by-page print completion information, described later, in association with the print job data.

The job-related-notification communication unit 213 is a communication device, such as a NIC, that receives various notifications related to print job data (a job-data transfer request, a page-print completion notification, a job completion notification, an error notification during printing, a cancellation notification by the user and the like.) from the MFP 101 (or the second printer 151). The job-related-notification communication unit 213 operates corresponding print job data in the job-data accumulation unit 215 in response to a received notification. Examples of the notification are as follows:

Print-job-data transfer request (hereinafter referred to as "transfer request"): a request for transferring print job data designated by the user to a transfer requesting printer (the MFP 101 or the second printer 151).

Page-print completion notification: a notification of page-by-page print completion information.

Job completion notification: a notification that all print job data is printed and the process is completed.

Error notification: a notification of an interruption in the print job because a failure has occurred in the MFP 101 (or the second printer 151) during printing.

Cancellation notification: a notification that the user has cancelled the print job Referring next to FIGS. 4 and 5, the function of the MFP 101 will be described. The second printer 151 has the same functional configuration.

Figure 4:
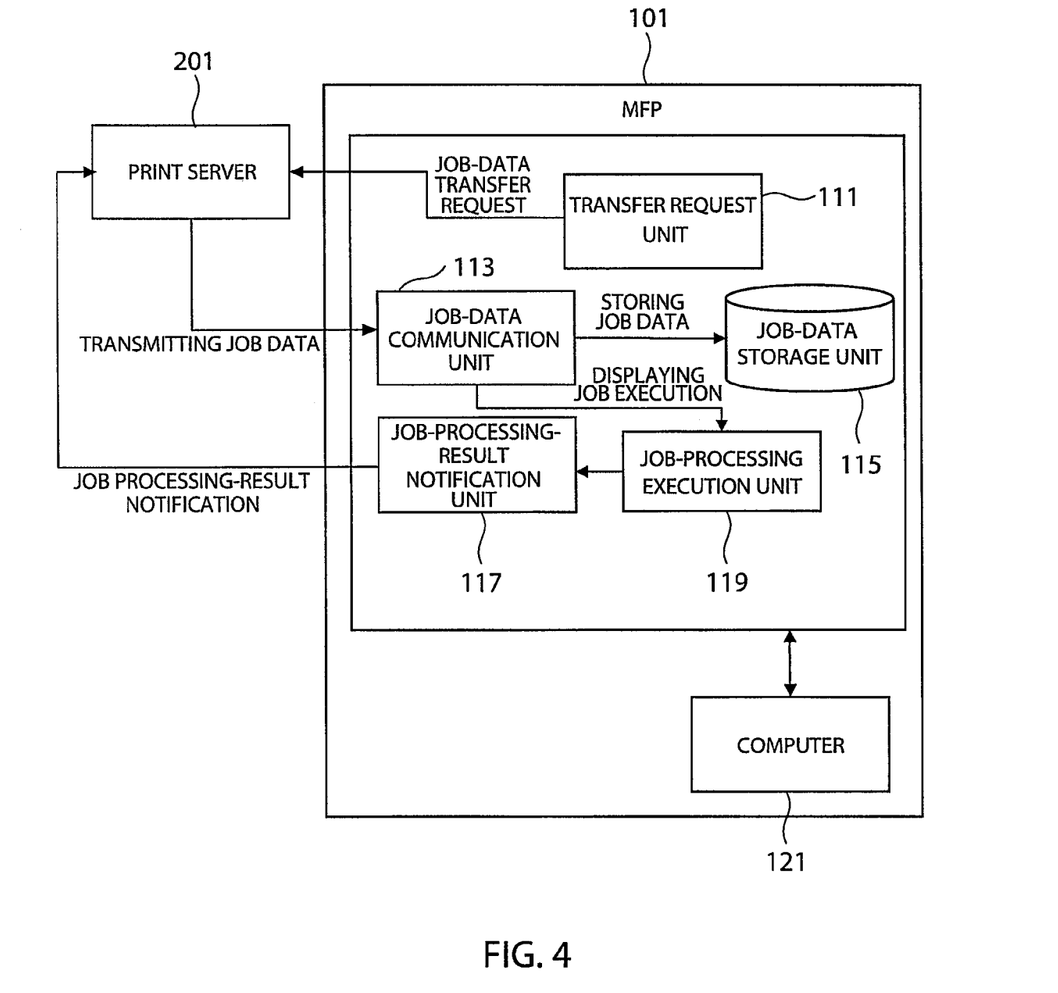
FIG. 4 illustrates a functional block diagram of a first printer according to an embodiment of the present invention.
Figure 5:
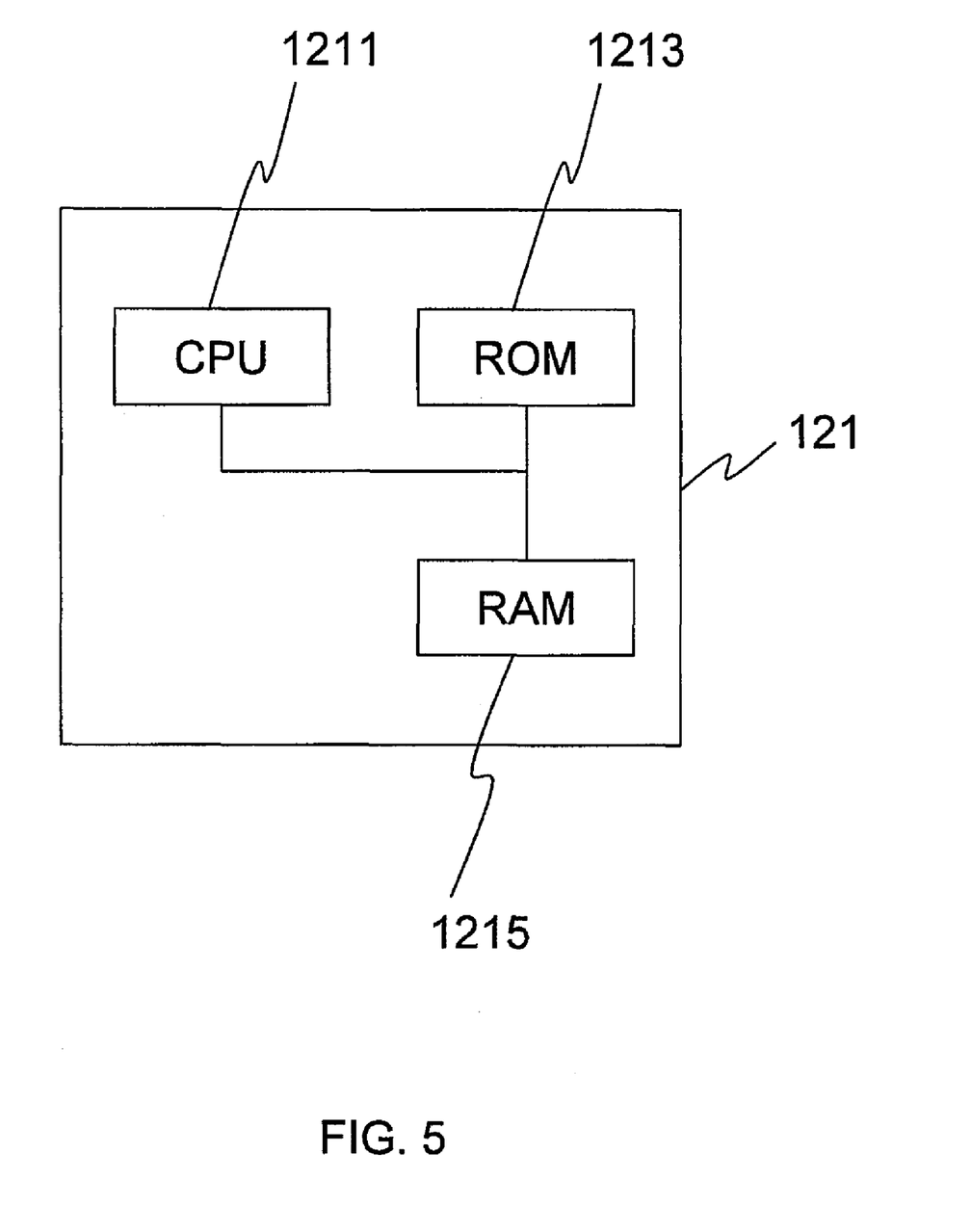
FIG. 5 illustrates the hardware architecture of a computer shown in FIG. 4.

As illustrated in FIG. 4, the MFP 101 includes a computer 121. As illustrated in FIG. 5, the computer 121 includes a CPU (central processing unit) 1211, a ROM (read only memory) 1213, and a RAM (random access memory) 1215.

The CPU 1211 is a processing unit that executes processes described in the printing program codes on the MFP 101. The ROM 1213 is a nonvolatile memory that stores, in advance, the printing program codes and data. The RAM 1215 is a memory that temporarily stores the printing program codes, during the execution thereof, and is used as a work area.

The computer 121 controls components in the MFP 101 by executing the printing program codes thereby operating the components as a transfer request unit 111, a job-data communication unit 113, a job-data storage unit 115, a job-processing execution unit 119, and a job-processing-result notification unit 117.

The transfer request unit 111 comprises an operation panel, such as a touch panel, and a communication device. The transfer request unit 111 receives a transfer request from the user through the touch panel and requests the print server 201 to transfer print job data, designated by the user, through the communication device.

The job-data communication unit 113 is a communication device, such as a NIC, that receives the print job data transmitted from the print server 201 in response to the transfer request. The job-data communication unit 113 receives the print job data and thereafter instructs the job-processing execution unit 119 to execute the print job.

The job-data storage unit 115 is a nonvolatile readable/writable storage device, such as a hard disk drive or a Flash Memory®. The job-data storage unit 115 temporarily stores the print job data that is received by the job-data communication unit 113.

The job-processing execution unit 119 is a print engine for printing print job data. The job-processing execution unit 119 rasterizes the print job data stored in the job-data storage unit 115 and executes printing. The job-processing execution unit 119 notifies the job-processing-result notification unit 117 of the progress of the print job processing (page-print completion notification, job completion notification, error notification during printing, cancellation notification by the user and the like.).

The job-processing-result notification unit 117 is a communication device, such as a NIC, that provides notification to the print server 201 from the job-processing execution unit 119.

Figure 6A:
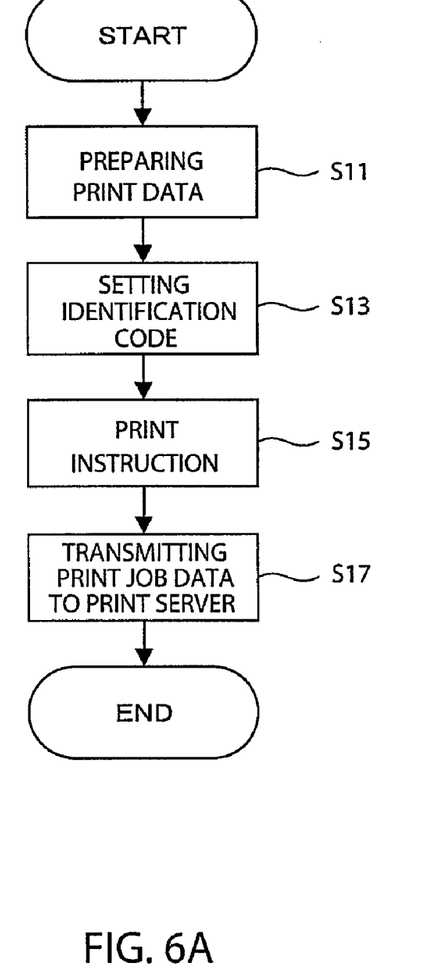
FIG. 6A illustrates a flowchart for the operation of a personal computer according to an embodiment of the present invention.

Referring next to FIG. 6A, a normal print process flow at the PC 301 will be described.

S11: The PC 301 prepares print data.

S13: The PC 301 sets an identification code to the print job.

S15: The PC 301 provides a print instruction.

S17: The PC 301 transmits the print job data to the print server 201. At that time, the PC 301 also transmits the identification code set by the user to the print server 201. The PC 301 may also transmit user authentication data (for example, a user ID (identification) and a password). The identification code may be transmitted, with or separately from the print job data. In either situation, the PC 301 transmits the identification code in an encrypted form (by using SSL/TLS in the communication channel or by encrypting the data itself) to the print server 201 to prevent unauthorized access.

The PC 301 may execute the process of the flowchart in FIG. 6A by the user operating the screen of a printer driver.

Figure 6B:
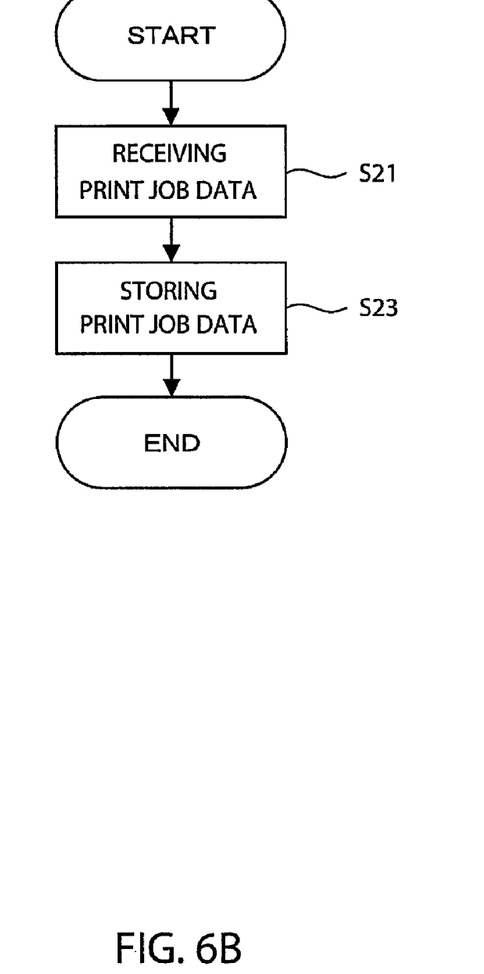
FIG. 6B illustrates a flowchart for the operation of the print server according to an embodiment of the present invention.

Referring next to FIG. 6B, a normal print process flow of the print server 201 will be described.

S21: The job-data transfer unit 211 receives the print job data from the PC 301.

S23: The job-data accumulation unit 215 stores the received print job data. At that time, the job-data accumulation unit 215 stores the user authentication data and the identification code in association with the print job data.

Figure 7A:
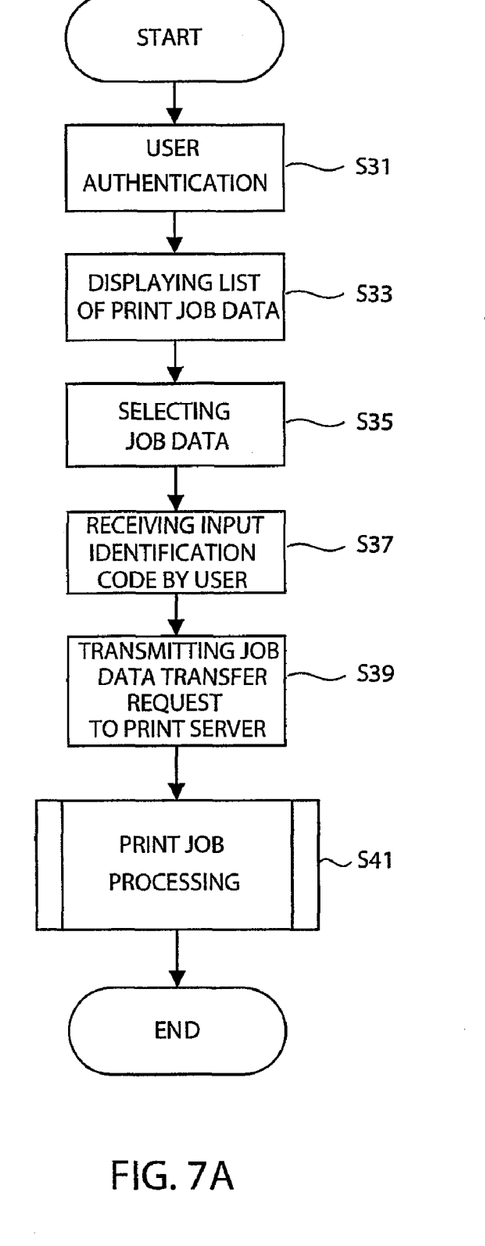
FIG. 7A illustrates a flowchart for the operation of the first printer according to an embodiment of the present invention.

Referring next to the flowchart in FIG. 7A, the process of issuing a transfer request from the MFP 101 will be described. This process is for generating a request from the MFP 101 to transfer the print job data accumulated in the job-data accumulation unit 215. The user can print the print job data if the user inputs an identification code corresponding to desired print job data to the MFP 101.

The process of generating a transfer request from the second printer 151 can be executed in the same way.

S31: When the user inputs authentication data using the transfer request unit 111, the MFP 101 inquires of the print server 101 to authenticate the user. Specifically, the transfer request unit 111 transmits the inputted authentication data to the print server 201. In the print server 201, the job-related-notification communication unit 213 receives the authentication data from the MFP 101 and validates the authenticity thereof. Specifically, the job-related-notification communication unit 213 compares the authentication data that it receives against the authentication data stored in the job-data accumulation unit 215 to determine whether they match. The job-related-notification communication unit 213 transmits the result of the determination to the MFP 101. If the result shows that the input authentication data is correct, the transfer request unit 111 authenticates the user. It is preferable that the user authentication data is concealed using encryption or the like.

S33: If the user is authenticated, the transfer request unit 111 requests the print server 201 to send a list of the print job data. The job-related-notification communication unit 213 transmits the list of the print job data of the user to the MFP 101, in response to the request from the transfer request unit 111. The transfer request unit 111 receives and displays the list of the transmitted print job data.

S35: The transfer request unit 111 receives a print job that the user selected from the list.

S37: If an identification code is set to the print job, the transfer request unit 111 receives the identification code that the user has inputted.

S39: The transfer request unit 111 transmits a transfer request corresponding to the selected print job along with the input identification code to the print server 201.

S41: The job-data communication unit 113 receives the print job data that was transmitted from the print server 201 in response to the transfer request in S39. The job-processing execution unit 119 prints the print job data that was received.

Figure 7B:
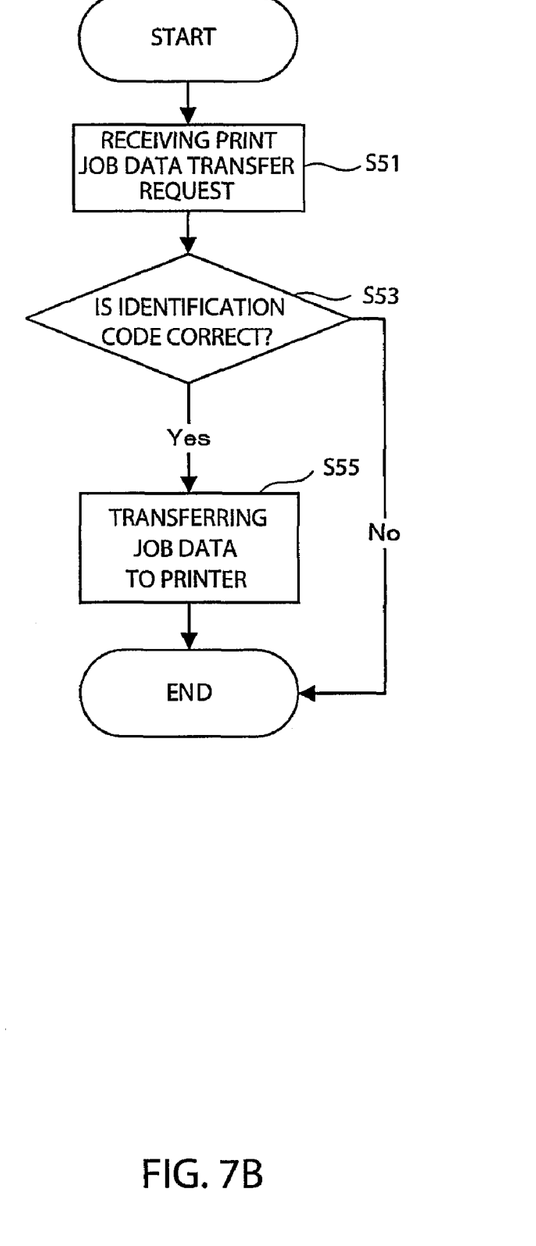
FIG. 7B illustrates a flowchart for the operation of the print server according to an embodiment of the present invention.

Referring now to the flowchart in FIG. 7B, the process in the print server 201 that is executed in relation to the process shown in FIG. 7A will be described.

S51: The job-related-notification communication unit 213 receives the transfer request (and the identification code) transmitted from the MFP 101.

S53: The job-data transfer unit 211 determines whether the identification code that was transmitted with the print job data received in S51 is correct. If the code is correct, then the process moves to S55. If the code is not correct, then the job-related-notification communication unit 213 sends an error notification that the identification code is not correct to the MFP 101. When the MFP 101 receives the error notification, that the identification code is not correct, the transfer request unit 111 requests that the user input an identification code again.

S55: The job-data transfer unit 211 transfers the designated print job data to the MFP 101 that generated the transfer request.

Thus, the print job data is transferred from the print server 201 to the printer (MFP 101 or the second printer 151) by a series of operations.

Figure 8:
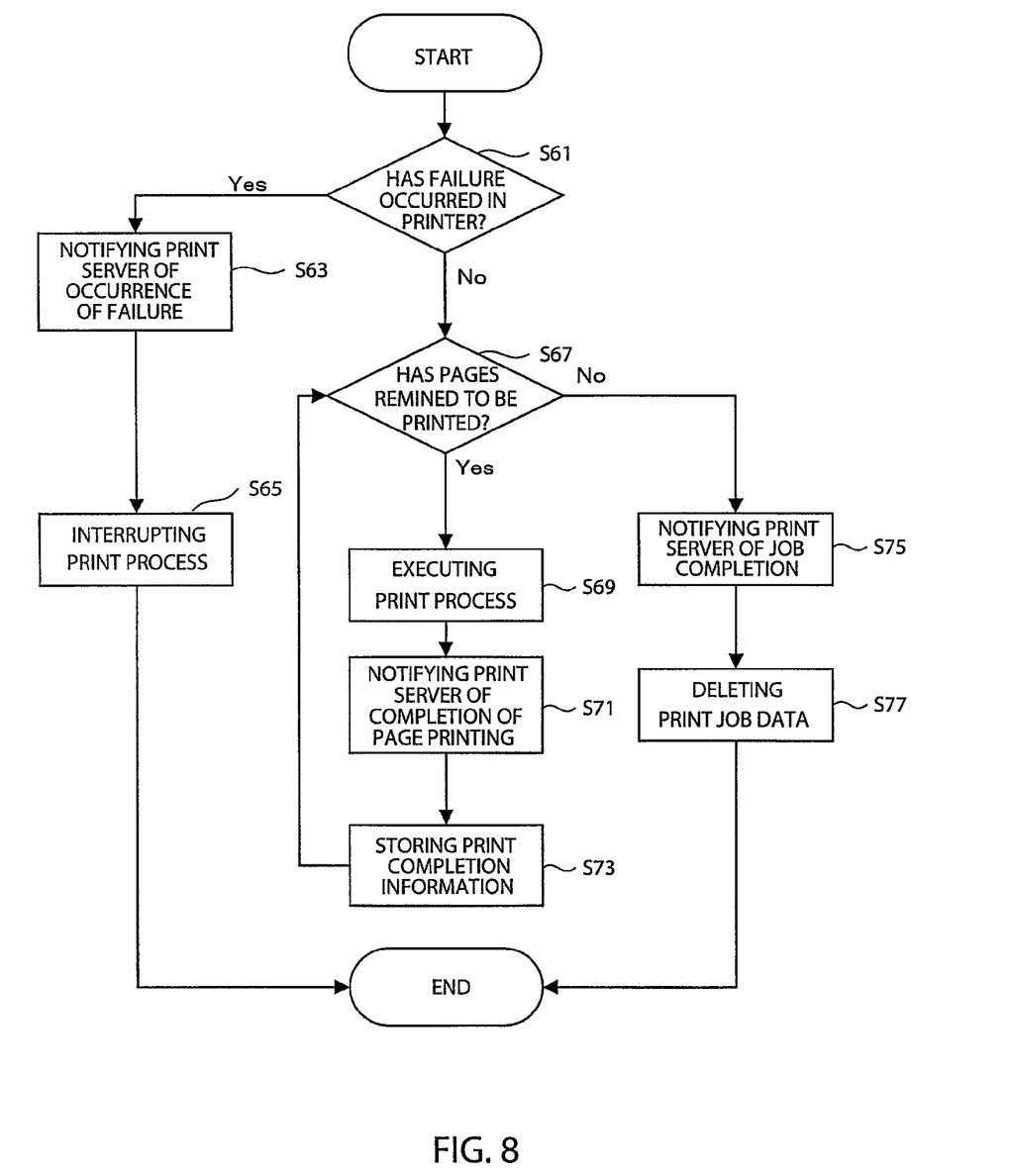
FIG. 8 illustrates a flowchart for the printing process of the first printer.

Referring to the flowchart in FIG. 8, the print job process of the MFP 101 will now be described. The same process also applies to the second printer 151. FIG. 8 illustrates a flowchart for the print process of the first printer.

S61: The job-processing execution unit 119 determines whether a failure has occurred in the MFP 101. If a failure has occurred, then the process moves to S63. If there was no failure, the process moves to S67.

S63: Since a failure has occurred in the MFP 101, the job-processing-result notification unit 117 notifies the print server 201 of the occurrence of the failure.

S65: The job-processing execution unit 119 interrupts the print process.

S67: The job-processing execution unit 119 determines whether pages remain to be printed. If pages remain to be printed, then the process moves to S69. If no pages remain to be printed, then the process moves to S75.

S69: The job-processing execution unit 119 prints the first page, of the pages on which the print job data is not printed.

S71: The job-processing-result notification unit 117 notifies the print server 201 of the completion of the printing of a page every time a page is printed during printing.

S73: The MFP 101 also stores page-by-page print completion information (information on how many pages have been printed) using the job-data storage unit 115.

S75: After printing all of the pages, the job-processing-result notification unit 117 notifies the print server 201 of the completion of the print job process.

S77: The job-data storage unit 115 deletes the print job data stored in the MFP 101 as well as the temporary information regarding how many pages have been printed. In the print server 201, when the job-related-notification communication unit 213 receives the completion notification from the job-processing-result notification unit 117, the job-data accumulation unit 215 deletes the print job data and related process information which are accumulated therein.

According to the above process flow, the information on how many pages have been printed, when the failure occurred during printing, remains in the MFP 101 (the second printer 151 where the print job is processed by the second printer 151) and the print server 201.

When the user wants to quickly complete the print job process, although there is no guarantee that the printer will recover from the failure quickly, the print job can be restarted by issuing a request to transfer uncompleted print job data from another normally operating printer. If an input of the identification code is requested at the transfer request, security can be maintained. The operation of the above printer will be described with reference to the flowchart in FIG. 9. Here, it is assumed that the print job is restarted from the MFP 101 as if a failure has occurred in the second printer 151.

Figure 9:
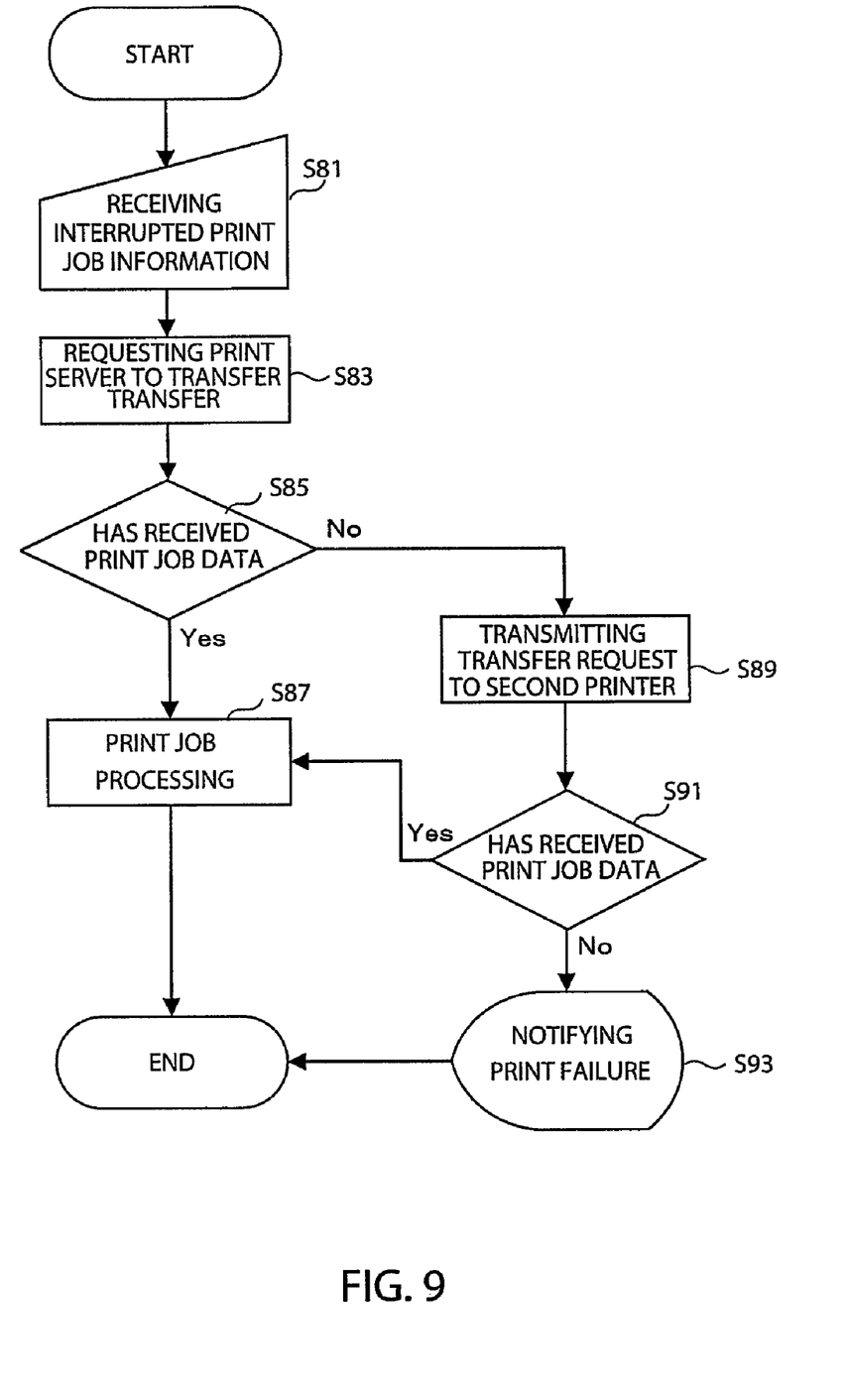
FIG. 9 illustrates a flowchart for the operation of the first printer when printing is restarted after interruption of printing.

S81: The transfer request unit 111 of the MFP 101 receives the interrupted print job information that the user inputs. At that time, the transfer request unit 111 also receives the identification code of the output job that is inputted. The process in S81 is specifically the same as the process from S33 to S35.

S83: The transfer request unit 111 requests the print server 201 to transfer the print job data corresponding to the interrupted print job. The process in S83 is specifically the same as the process in S39.

S85: The job-data communication unit 113 determines whether the print job data has been received from the print server 201. If the print data has been received, then the process moves to S87. If the print data is not received, then the process moves to S89.

S87: Since the print job data is received, the job-processing execution unit 119 executes the print job and terminates the operation. The process in S87 is specifically the same as the processes in S41 and from S61 to S77.

S89: Since the print job data could not be received, the transfer request unit 111 transmits a transfer request to the second printer 151, which had been working (failed) until the failure, requesting a transfer of the print job data. In the second printer 151, in response to the transfer request from the MFP 101, the job-data communication unit 113 transmits the interrupted print job data to the MFP 101.

The print job data remains in the second printer 151. If the failure is due to a cause that is independent of data communication, such as no paper or empty toner, the job-data communication unit 113 of the second printer 151 can be operated. Therefore, in response to the transfer request from the MFP 101, the second printer 151 can transmit the print job data. This process allows printing to be restarted even if a failure occurs in the print server 201 so that it cannot transmit the print job.

S91: The job-data communication unit 113 determines whether the print job data has been received from the second printer 151. If the print job data has been received, then the process moves to S87. If the print job data is not received, then the process moves to S93.

S93: The transfer request unit 111 notifies the user of the failure by displaying that printing has failed.

Thus, the print job process, after the occurrence of the failure, is finished.

In the above situation, upon receiving a request to transfer an interrupted print data job, the print server 201 will send the following data:

(1) The same print job data as that processed before.
(2) Print job data including only unprinted page data.

The user can select either (1) or (2) with the transfer request unit 111 of the MFP 101. The transfer request unit 111 then notifies the print server 201 of either (1) or (2) depending on the user's selection.

In the print server 201, the job-related-notification communication unit 213 calculates the number of completed pages for the print job process using the page-by-page print completion information accumulated in the job-data accumulation unit 215.

The job-data transfer unit 211 transmits the number of pages completed and the print job data to the MFP 101.

If (1) is selected, data regulating the number of pages completed is also sent from the print server 201. Accordingly, the job-processing execution unit 119 of the MFP 101 does not print the pages completed but prints only unprinted pages.

If the transfer request is provided to the second printer 151, the job-processing execution unit 119 in the second printer 151 determines the number of completed pages for the print job process.

The job-processing-result notification unit 211 transmits the number of completed pages and the print job data to the MFP 101.

If (2) is selected, the job-data transfer unit 213, in the print server 201, generates print job data including only unprinted page data based on the number of pages completed for the print job process, which is calculated as in the above. The job-data transfer unit 213 transmits the generated print job data to the MFP 101. The MFP 101 needs to only process the transmitted print job data.

If the transfer request is provided to the second printer 151, the job-processing execution unit 119 in the second printer 151 generates print job data including only unprinted page data based on the number of completed pages for the print job process, which is determined as in the above. The job-data transfer unit 213 transmits the generated print job data to the MFP 101.

When (1) is selected, the print server 201 may acquire the page-by-page print completion information from the second printer 151. The details are as described below.

In the print server 201, the job-related-notification communication unit 213 receives the notification. The job-data transfer unit 211 requests information relating to the progress of the print job process from the second printer 151 in response to the notification.

In the second printer 151, the job-processing-result notification unit 117 calculates the number of completed pages for the print job process based on the page-by-page print completion information, in response to the progress information request from the print server 201. The job-processing result notification unit 117 sends the number of the pages to the print server 201.

The print server 201 transmits the progress information, relating to the print job process transmitted from the second printer 151, and the print job data to the MFP 101.

Even if a failure occurs in the MFP 101, the MFP 101 can resume printing from an imprinted page if it recovers quickly from the failure. In this situation, the process except S89 and S91 in FIG. 9 should be executed.

In part, in an embodiment, the present invention may be summarized as follows.

A print system according to an embodiment of the present invention includes a print server and a first printer. The first printer is configured to receive print job data and to execute printing. The first printer includes a job-data communication unit, a job-processing-result notification unit, and a transfer request unit. The job-data communication unit is configured to receive the print job data from the print server. The job-processing-result notification unit is configured to provide the print server with a page-by-page of print completion information. The transfer request unit is configured to transmit a request to transfer print job data corresponding to an interruption of a print job to the print server. The print server is configured to receive the print job data from a terminal device. The print server includes a job-related-notification communication unit, a job-data accumulation unit, and a job-data transfer unit. The job-related-notification communication unit is configured to receive the page-by-page print completion information from the job-processing-result notification unit. The job-data accumulation unit is configured to accumulate the print job data received from the terminal device and to accumulate, in association with the print job data, the page-by-page print completion information. In response to the transfer request from the transfer request unit, the job-data transfer unit is configured to transfer the print job data, which is accumulated in the job-data accumulation unit, to the first printer that generated the transfer request.

Accordingly, even if printing is interrupted due to a failure in the first printer, the print server stores how many pages have been printed. This allows the remaining pages to be quickly printed in response to a print-job-data transfer request from the first printer.

In addition, if in response to the transfer request print job data is not transmitted from the print server, the transfer request unit may transmit the transfer request to a second printer where the print job is interrupted.

Accordingly, even if a failure occurs in the print server, print job data remains in the second printer that has performed printing. Thus, a print-job-data transfer request can be transmitted to the second printer.

In addition, in response to the transfer request, the job-data communication unit may receive the print job data transmitted from the second printer.

Accordingly, even if a failure occurs in the print server, the remaining printing job can be quickly restarted.

In addition, upon the transfer request, the transfer request unit may transmit the identification code of the print job data to the print server. The job-data transfer unit may compare the identification code transmitted from the transfer request unit against the identification code of the print job data accumulated in the job-data accumulation unit, and only if the two identification codes match, the job-data transfer unit may transfer the print job data.

Accordingly, secure printing of the remaining printing job that was interrupted due to the occurrence of a failure or the like can be performed by checking the identification code.

A computer-readable recording medium according to an embodiment of the present invention stores printing program codes that are executed by a first printer computer and a print server computer. The printing program codes include first to seventh program codes. The first program code causes the print server computer to receive print job data from a terminal device and to accumulate the print job data. The second program code causes the first printer computer to receive the print job data from the print server. The third program code causes the first printer computer to print the print job data. The fourth program code causes the first printer computer to provide the print server with a page-by-page of print completion information. The fifth program code causes the print server computer to receive the page-by-page print completion information from the first printer. The fifth program code causes the print server computer to accumulate the page-by-page print completion information in association with the print job data. The sixth program code causes the first printer computer to transmit a request to transfer print job data corresponding to interrupted print job to the print server. The seventh program code causes the print server computer to transfer, in response to the transfer request from the first printer, the accumulated print job data to the first printer that generated the transfer request.

Accordingly, even if printing is interrupted due to the occurrence of a failure in the first printer, the print server stores how many pages have been printed. This allows the remaining pages to be quickly printed in response to a print-job-data transfer request from the first printer.

A method of printing according to an embodiment of the present invention includes the steps of: (1) causing a first printer computer to receive a print job data from the print server; (2) causing the first printer computer to print the print job data; (3) causing the first printer computer to provide the print server with page-by-page print completion information; (4) causing the print server computer to receive the page-by-page print completion information from the first printer; (5) causing the print server computer to accumulate the page-by-page print completion information in association with the print job data; (6) causing the first printer computer to transmit a request to transfer print job data corresponding to an interrupted print job to the print server; and (7) causing the print server computer to transfer, in response to the transfer request from the first printer, the accumulated print job data to the first printer that generated the transfer request.

Accordingly, even if printing is interrupted due to the occurrence of a failure in the first printer, the print server stores how many pages have been printed. This allows the remaining pages to be quickly printed in response to a print-job-data transfer request from the first printer.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A print system comprising:
a print server configured to receive print job data from a terminal device; and
a first printer and a second printer configured to receive the print job data and to execute printing,
each of the first printer and the second printer includes:
a job-data communication unit configured to receive the print job data from the print server;
a job-processing-result notification unit configured to provide the print server with a page-by-page of print completion information; and
a transfer request unit configured to transmit a request to transfer print job data corresponding to the print job to the print server;
a job data storage unit configured to store the print job data received from the print server and store the page-by-page print completion information; and
the print server includes:
a job-related-notification communication unit configured to receive the page-by-page print completion information from the job-processing-result notification unit;
a job-data accumulation unit configured to accumulate the print job data received from the terminal device and to accumulate, in association with the print job data, the page-by-page print completion information; and
a job-data transfer unit configured to transfer, in response to the transfer request from the transfer request unit, the print job data accumulated in the job-data accumulation unit to a printer that generated the transfer request, wherein
if a failure occurs in the second printer, the job-processing-result notification unit of the second printer is configured to provide an occasion of the failure to the print server and the second printer is configured to interrupt the print job;

the transfer request unit of the first printer is configured to transmit the transfer request of the print job data corresponding to the interrupted print job to the print server; and if the print job data is not transmitted from the print server in response to the transfer request, the transfer request unit of the first printer is configured to transmit the transfer request of the interrupted print job to the second printer interrupting the print job.

2. The print system according to claim 1, wherein the job data communication unit of the second printer is configured to transmit the job data stored in the job data storage unit of the second printer to the first printer, in response to the transfer request of the interrupted print job from the first printer.

3. The print system according to claim 2, wherein the job-data communication unit of the first printer receives the print job data transmitted from the second printer in response to the transfer request.

4. The print system according to claim 1, wherein the transfer request unit transmits the identification code of the print job data to the print server upon the transfer request; and the job-data transfer unit compares the identification code transmitted from the transfer request unit against the identification code of the print job data accumulated in the job-data accumulation unit, and only if the two identification codes match, the job-data transfer unit transfers the print job data.

5. A non-transitory computer-readable recording medium that stores printing program codes that are executed by a first printer computer, a second printer computer, and a print server computer, the printing program codes comprising:

a first program code for causing the print server computer to receive print job data from a terminal device and to accumulate the print job data;

a second program code for causing the first and second printer computers to receive the print job data from a print server;

a third program code for causing the first and second printer computers to print the print job data;

a fourth program code for causing the first and second printer computers to provide the print server with page-by-page print completion information;

a fifth program code for causing the print server computer to receive the page-by-page print completion information from a first printer;

a fifth program code for causing the print server computer to accumulate the page-by-page print completion information in association with the print job data;

a sixth program code for causing the first and second printer computers to transmit a request to transfer print job data corresponding to interrupted print job to the print server;

a seventh program code for causing the print server computer to transfer, in response to the transfer request from the first printer, the accumulated print job data to a printer that generated the transfer request; and an eighth program code for causing the first and second printer computers to store the print job data received from the print server and store the page-by-page of print completion information, wherein if a failure occurs in a second printer, the third program code causes the second printer computer to provide an occasion of the failure to the print server and interrupt the print job;

the sixth program code causes the first printer computer to transmit the transfer request of the print job data corresponding interrupted print job to the print server; and if the print job data is not transmitted from the print server in response to the transfer request, the sixth program code causes the first printer computer to transmit the transfer request of the interrupted print job to the second printer interrupting the print job.

6. The non-transitory computer-readable recording medium according to claim 5, the printing program codes further comprising a ninth program code for causing the second printer computer to transmit the job data stored in the second printer to the first printer, in response to the transfer request of the interrupted print job from the first printer.

7. The non-transitory computer-readable recording medium according to claim 6, wherein the second program code causes the first printer computer to receive the print job data transmitted from the second printer in response to the transfer request.

8. The non-transitory computer-readable recording medium according to claim 5, wherein the sixth program code causes the first and second printer computers to transmit the identification code of the print job data to the print server upon the transfer request; and the seventh program code cases the print server computer to compare the identification code transmitted from the transfer request unit against the identification code of the print job data accumulated in the job-data accumulation unit, and only if the two identification codes match, the seventh program code cases the print server computer to transfer the print job data.

9. A method of printing by a first printer, a second printer, and a print server comprising the steps of:

causing a-first and second printer computers to receive a print job data from the print server;

causing the first and second printer computers to print the print job data;

causing the first and second printer computers to provide the print server with page-by-page print completion information;

causing the print server computer to receive the page-by-page print completion information from the first printer;

causing the print server computer to accumulate the page-by-page print completion information in association with the print job data;

causing the first and second printer computers to transmit a request to transfer print job data corresponding to an interrupted print job to the print server;

causing the print server computer to transfer, in response to the transfer request from the first printer, the accumulated print job data to a printer that generated the transfer request; and causing the first and second printer computers to store the print job data received from the print server and store the page-by-page of print completion information, wherein if a failure occurs in the second printer, the second printer provides an occasion of the failure to the print server and interrupts the print job;

the first printer transmits the transfer request of the print job data corresponding to the interrupted print job to the print server; and if the print job data is not transmitted from the print server in response to the transfer request, the first printer transmits the transfer request of the interrupted print job to the second printer interrupting the print job.

10. The method according to claim 9 wherein
the second printer transmits the job data stored in the job data storage unit of the second printer to the first printer, in response to the transfer request of the interrupted print job from the first printer.

11. The method according to claim 10, wherein
the first printer receives the print job data transmitted from the second printer in response to the transfer request.

12. The method according to claim 9, wherein
the first and second printer transmit the identification code of the print job data to the print server upon the transfer request; and
the print server compares the identification code transmitted from the transfer request unit against the identification code of the print job data accumulated in the job-data accumulation unit, and only if the two identification codes match, the print server transfers the print job data.

* * * * *